US011222057B2

(12) United States Patent
Ackermann et al.

(10) Patent No.: US 11,222,057 B2
(45) Date of Patent: Jan. 11, 2022

(54) METHODS AND SYSTEMS FOR GENERATING DESCRIPTIONS UTILIZING EXTRACTED ENTITY DESCRIPTORS

(71) Applicant: INTERNATIONAL BUSINESS MACHINES CORPORATION, Armonk, NY (US)

(72) Inventors: Christopher Ackermann, Fairfax, VA (US); Charles Beller, Baltimore, MD (US); Edward Katz, Herndon, VA (US); Kristen Summers, Takoma Park, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 16/534,959

(22) Filed: Aug. 7, 2019

(65) Prior Publication Data
US 2021/0042340 A1   Feb. 11, 2021

(51) Int. Cl.
*G06F 16/00* (2019.01)
*G06F 16/34* (2019.01)
*G06F 16/383* (2019.01)

(52) U.S. Cl.
CPC .......... *G06F 16/345* (2019.01); *G06F 16/383* (2019.01)

(58) Field of Classification Search
CPC ............................ G06F 16/345; G06F 16/383
See application file for complete search history.

(56) References Cited

U.S. PATENT DOCUMENTS

| | | | |
|---|---|---|---|
| 7,165,066 B2 | 1/2007 | Kaiser | |
| 7,930,169 B2 | 4/2011 | Billerey-Mosier | |
| 8,712,758 B2 | 4/2014 | Crouch et al. | |
| 8,856,145 B2 | 10/2014 | Parikh et al. | |
| 9,922,026 B2 | 3/2018 | Sevenster et al. | |
| 2003/0182310 A1* | 9/2003 | Charnock | G06Q 10/10 |
| 2005/0080613 A1* | 4/2005 | Colledge | G06F 16/951 |
| | | | 704/9 |
| 2006/0287988 A1* | 12/2006 | Mason | G06Q 30/02 |
| 2008/0313147 A1* | 12/2008 | Svore | G06F 16/3331 |
| 2009/0070322 A1* | 3/2009 | Salvetti | G06F 16/3334 |

(Continued)

OTHER PUBLICATIONS

Sophie Wang. "Data Analysis Project: Semi-Supervised Discovery of Named Entities and Relations from the Web", <https://www.ml.cmu.edu/research/dap-papers/sophiewangdap.pdf> (Year: 2009).*

(Continued)

*Primary Examiner* — Syed H Hasan
(74) *Attorney, Agent, or Firm* — Griffiths & Seaton PLLC

(57) ABSTRACT

Embodiments for generating descriptions of entities are provided. A plurality of references to an entity within a corpus are identified. The corpus includes a plurality of documents. Descriptors for the entity are extracted from portions of the plurality of documents associated with the plurality of references to the entity. A score for each of the descriptors is calculated based on at least one of a location of the reference associated with the descriptor within the respective document and a location of the descriptor within the respective document. A description of the entity is generated utilizing at least some of the descriptors based on said calculated scores.

18 Claims, 6 Drawing Sheets

(56) References Cited

U.S. PATENT DOCUMENTS

2015/0154193 A1* 6/2015 Dave .................. G06N 7/005
　　　　　　　　　　　　　　　　　　　　　　707/748
2015/0379134 A1* 12/2015 Bax .................. G06F 16/90328
　　　　　　　　　　　　　　　　　　　　　　707/722
2018/0143980 A1　5/2018 Popov et al.

OTHER PUBLICATIONS

Liu, Xiaojiang & Yu, Nenghai. "People Summarization by Combining Named Entity Recognition and Relation Extraction." JCIT. 5. 233-241. 10.4156/jcit.vol5.issue10.30. (Year: 2010).*

* cited by examiner

METHODS AND SYSTEMS FOR GENERATING DESCRIPTIONS UTILIZING EXTRACTED ENTITY DESCRIPTORS

GOVERNMENT LICENSE RIGHTS TO CONTRACTOR-OWNED INVENTIONS MADE UNDER FEDERALLY SPONSORED RESEARCH AND DEVELOPMENT

This Invention was made with Government support under Contract No. 2018-18010800001. The Government has certain rights in the invention.

BACKGROUND OF THE INVENTION

Field of the Invention

The present invention relates in general to computing systems, and more particularly, to various embodiments for generating descriptions of entities by extracting entity descriptors from documents.

Description of the Related Art

Computing systems (and/or search algorithms) are often used to search various corpora (one or more corpus), such as one or more text-based documents, spreadsheets, etc., for references to (or mentions of) names (or other identifying terms) of entities (e.g., individuals/people, organizations, objects, places, etc.). With some systems, the results are provided to the user in document "clusters" (or "bin" data structures or "bins"), which may include the entity name and a collection of documents (and/or excerpts of documents) that include references to the entity, perhaps along with other information, such as entities that are determined to be related to the target (or intended) entity.

However, in order for a user to find out any significant information about the entities, they must typically read or search through the documents (or excerpts) of documents in the clusters. Such a process may be cumbersome and time consuming.

SUMMARY OF THE INVENTION

Various embodiments for generating descriptions of entities, by a processor, are provided. A plurality of references to an entity within a corpus are identified. The corpus includes a plurality of documents. Descriptors for the entity are extracted from portions of the plurality of documents associated with the plurality of references to the entity. A score for each of the descriptors is calculated based on at least one of a location of the reference associated with the descriptor within the respective document and a location of the descriptor within the respective document. A description for the entity is generated utilizing at least some of the descriptors based on said calculated scores.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
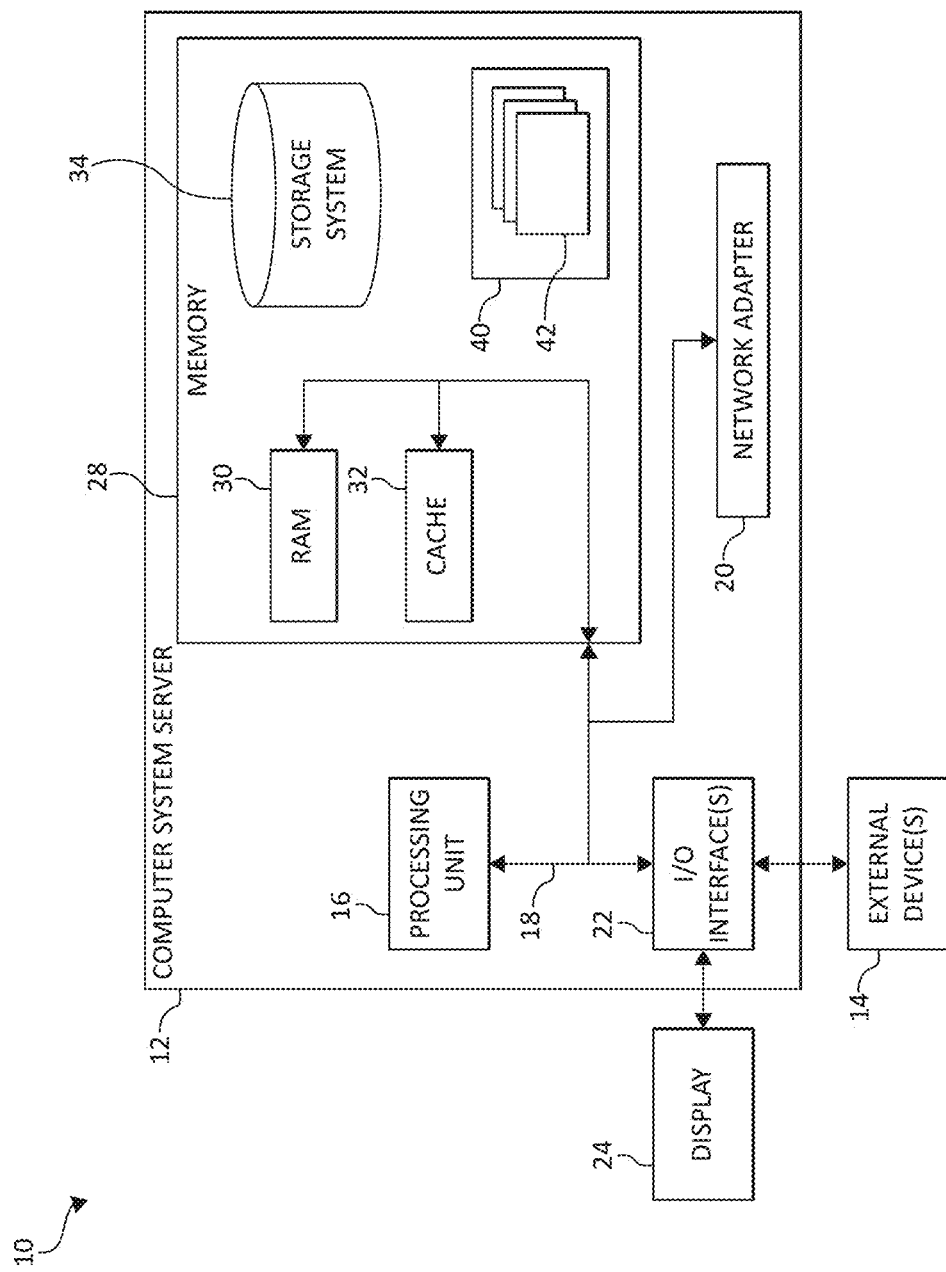
FIG. 1 is a block diagram depicting an exemplary computing node according to an embodiment of the present invention.

As discussed above, computing systems (and/or search algorithms) are often used to search various corpora (one or more corpus), such as one or more text-based documents, spreadsheets, etc., for references to (or mentions of) names (or other identifying terms) of entities (e.g., individuals/people, organizations, objects, places, etc.). Some such systems disambiguates the set of discovered entities using, for example, cross document co-reference algorithms that makes use of related entities, surrounding text, and the name of the entity as features. The results may be provided to the user in document "clusters" (or "bin" data structures or "bins"), which may include the entity name and a collection of documents (and/or excerpts of documents) that include references to the entity, perhaps along with other information, such as entities that are determined to be related to the target (or intended) entity.

In some instances, subsequent steps are taken to derive an understanding of the target entity (or entities) (e.g., who or what the target entity is). One approach is to collect closely related entities via relationship extraction. Another approach is to compare the discovered entities with entries in a structured entity store.

Additionally, the searched documents may include various "descriptors," which are terms or phrases that describe, for example, the occupation of an individual, such as "Company XYZ CEO" or "basketball player." Descriptors are often used in news articles and other types of reporting to explain to the reader the role of the individual. They may also help clarify what individual (or organization, location, etc.) is being discussed since multiple individuals may share the same name.

However, in order for a user to learn any significant information about the entities, they must typically read or search through the documents (or excerpts) of documents in the clusters to, for example, find or identify such descriptors. Such a process may be cumbersome and time consuming. As such, in at least some situations, it would be helpful to have meaningful summaries or descriptions automatically generated and provided to the user when the results of such searches are presented.

To address these needs and/or the shortcomings in the prior art, in some embodiments described herein, methods and/or systems are disclosed that leverage text (or words, etc.) used to describe entities in reporting to extract (or identify) one or more descriptors for the entities (e.g., represented by document clusters), which are then used to generate a description (or summary) for the entities. The description may then be provided to the user in association with the results of the search (e.g., rendered by a rendering device along with the search results).

Generally, in some embodiments, references to (or mentions of) an entity within a corpus (e.g., including one or more document) are identified (and/or received, retrieved, etc.). Descriptors (e.g., noun phrases, alternative names, appositives, etc.) for the entity are extracted (or identified) from portions of the plurality of documents associated with the references to the entity (e.g., the extracted/identified descriptors are within a predetermined window or distance of the reference with which they are associated). A score for each of the descriptors is calculated based on a location of the associated reference within the respective document and/or a location of the respective descriptor within the respective document. A description for the entity is generated utilizing at least some of the descriptors based on the calculated scores. In other words, at least some of the descriptors (e.g., those with relative high scores) are utilized to generate a description for the entity.

In some embodiments, a user initially queries a retrieval system (or search module) using a query name (or enters a name of an entity or target/intended entity to be searched for). Mentions of (or references to) that name (perhaps accounting for typographical and/or spelling errors) are retrieved from (or identified within) the appropriate corpus (i.e., the one or more document to be searched), as will be appreciated by one skilled in the art. However, it should be understood that in some embodiments this process may already have been performed utilizing an appropriate retrieval/search system, the results of which are retrieved and/or identified by a system performing the functionality described herein.

Phrases (or terms) are identified in the context of entity references (or mentions). However, in some embodiments, the system is operated using the assumption that not all references are equally likely to be surrounded by descriptors (or have descriptors located nearby) because, for example, entities are often more fully described near the beginning of a document (e.g., an article) as opposed to near the end of the document. Additionally, descriptors may be more likely to be listed or mentioned near references to entities that include the full name of the entity (e.g., "John Michael Doe" vs. "John Doe" or "John"). As such, in some embodiments, the references are scored based on, for example, how early the reference appears in the document (e.g., page number, number of words from the beginning, etc.) and/or whether or not the reference is determined to include (or list) the full name of the entity. In some embodiments, only references that are determined to include the full name of the entity are utilized.

In some embodiments, descriptors are then extracted from the document(s). For example, descriptive terms, phrases, etc., such as noun phrases, that are associated with an entity reference may be identified. The extracted descriptors may include, for example, the noun phrases that occur immediately before and after the entity reference. This process may be performed utilizing a Natural Language Processing (NLP) technique, as is commonly understood. In some embodiments, descriptors are only identified as being associated with a particular entity reference if they appear within a predetermined "window" or "distance" of the reference (e.g., within the same sentence, the previous/subsequent sentence, clause, or phrase, etc.). The extracted or identified descriptors (or candidate descriptors) may then be scored utilizing or based on, for example, the calculated score for the respective reference, described above.

In some embodiments, the candidate descriptors are then "reconciled." This process may include consolidating multiple, similar descriptors into a single descriptor and combining the scores thereof. For example, if one identified descriptor is "CEO" and another is "Company XYZ CEO," the two descriptors may be consolidated into a single (or "composite") descriptor. The composite descriptor may be the same as the longer, more complete identified descriptor (e.g., "Company XYZ CEO"). The combining (or adding) of the scores of the individual similar descriptors may reflect the frequency of occurrence of the descriptors, as well as their potential for being a representative descriptor as expressed by the individual descriptor scores.

At least some of the descriptors are then selected to be utilized to generate a description or summary of (e.g., one or more phrases to describe) the entity. This process may include sorting the candidate descriptors based on the calculated scores (e.g., with those with the higher scores being ranked higher). The top n (e.g., one or two) descriptors may then be utilized to generate the description. The description may then be provided to the user (e.g., via an electronic communication, pop-up window, etc.), perhaps in conjunction with the presentation of the results for the entity search (e.g., the cluster(s)).

In some embodiments, any descriptors that have calculated scores that are below a predetermined threshold are removed from the list (and thus not utilized to generate the description). In some instances, such may result in all of the descriptors being removed from the list. In such cases, no description of the entity may be generated.

In some embodiments, at least some of the functionality described herein is performed utilizing a cognitive analysis. The cognitive analysis may include classifying natural language, analyzing tone, and analyzing sentiment (e.g., scanning for keywords, key phrases, etc.) with respect to, for example, content and communications sent to and/or received by users, and/or other available data sources. In some embodiments, natural language processing (NLP), Mel-frequency cepstral coefficients (MFCCs) (e.g., for audio content), and/or region-based convolutional neural network (R-CNN) pixel mapping (e.g., for images/videos), as are commonly understood, are used. As such, it should be understood that the methods/systems described herein may be applied to content other than text-based (or alphanumeric) content but also audio content and/or images/videos (e.g., a descriptor for an entity is referenced in an audio and/or video file).

The processes described herein may utilize various information or data sources associated with users (e.g., users who provide search queries) and/or the content (e.g., the document(s), file(s), etc. within the corpus). With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases. The cognitive profile(s) may be utilized to, for example, determine or specify the intended target entity or entities of a user (or users).

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the generating of descriptions of (or for) entities, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that the embodiments described herein may be applied to the names (or other identifying terms) of any type of entity. That is, although some embodiments described herein are described with respect to individuals (and/or given/family names, nicknames, alternative names, aliases, etc. thereof), the methods/systems described herein may be applied to the names (or alternative names) of any type of entity, such as organizations, objects, places, etc.

It should also be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for generating a description of an entity, by a processor, is provided. A plurality of references to an entity within a corpus are identified. The corpus includes a plurality of documents. Descriptors for the entity are extracted from portions of the plurality of documents associated with the plurality of references to the entity. A score for each of the descriptors is calculated based on at least one of a location of the reference associated with the descriptor within the respective document and a location of the descriptor within the respective document. A description of the entity is generated utilizing at least some of the descriptors based on said calculated scores.

The generated description of the entity may be caused to be rendered by a rendering device. Each of the descriptors may be located within a predetermined window of the reference associated with the descriptor within the respective document.

The calculating of the score for each of the descriptors may be based on a location of the reference associated with the descriptor within the respective document and a proximity of the descriptor to the reference associated with the descriptor.

The extracting of the descriptors may be performed utilizing a natural language processing technique. Each of the descriptors may include at least one noun phrase.

Each of the descriptors may be compared to the others of the descriptors. A first of the descriptors having a first calculated score and a second of the descriptors having a second calculated score may be consolidated into a composite descriptor based on the comparing of each of the descriptors to the others of the descriptors. A composite score for the composite descriptor may be calculated based on the first calculated score and the second calculated score.

The generating of the description of the entity utilizing the at least some of the descriptors may be performed utilizing only those of the descriptors with a calculated score above a predetermined threshold.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
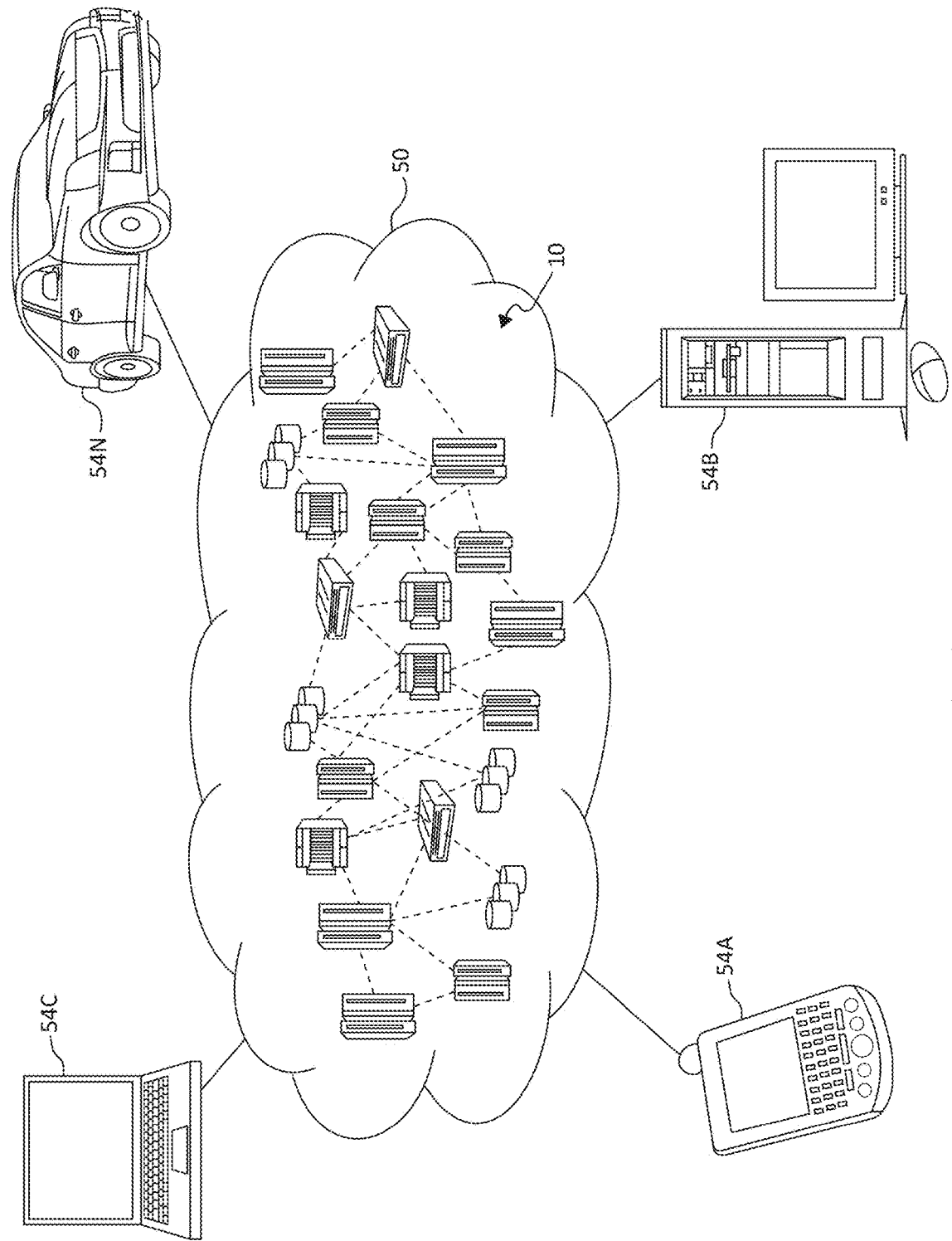
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
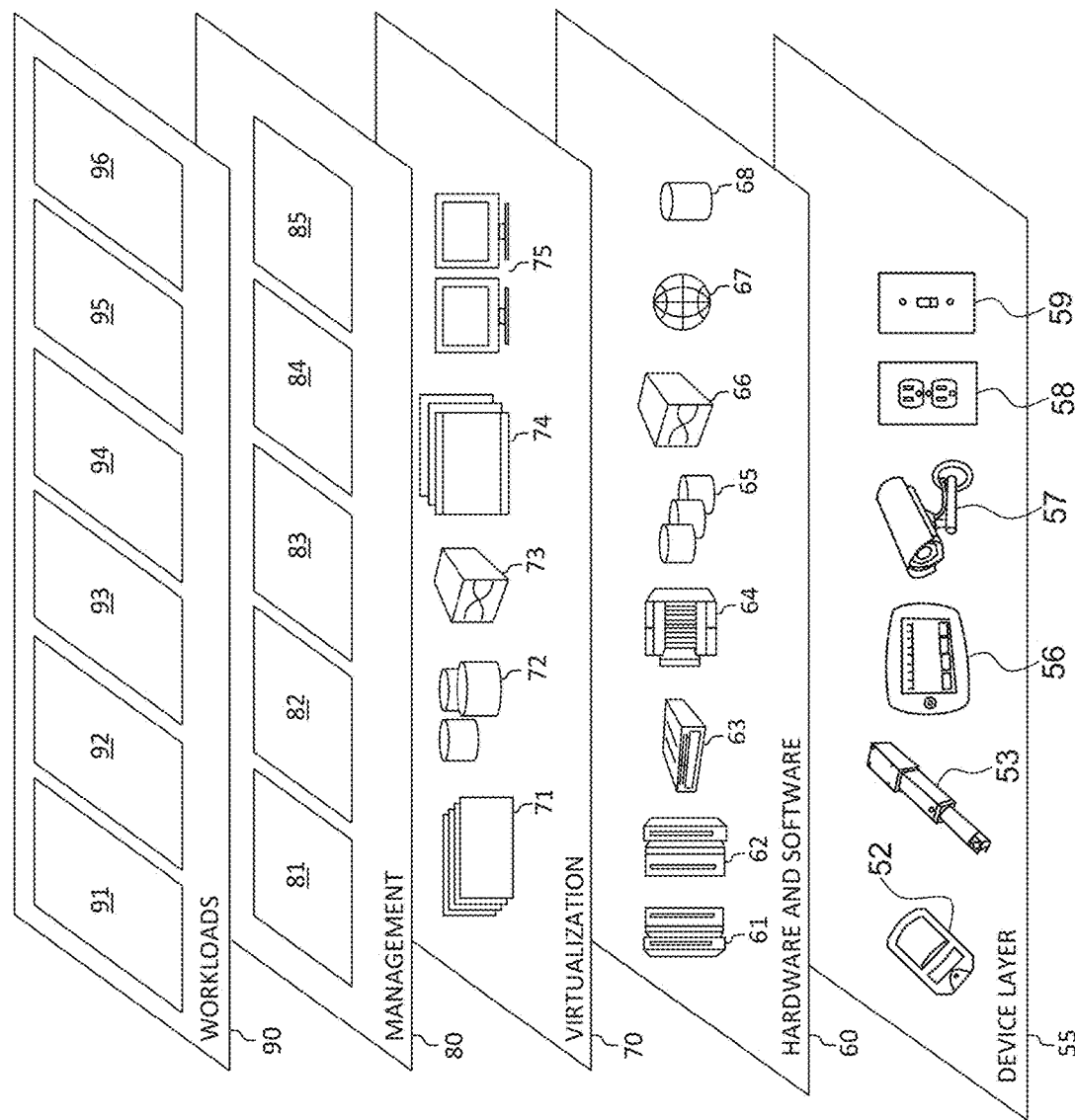
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for generating descriptions of entities, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems for generating descriptions of entities, such as based on identified references to the entities in one or more corpus, are provided. In some embodiments, references to (or mentions of) an entity within a corpus (e.g., including one or more document) are identified (and/or received, retrieved, etc.). Descriptors (e.g., noun phrases, alternative names, appositives, etc.) for the entity are extracted (or identified) from portions of the plurality of documents associated with the references to the entity (e.g., the descriptors are within a predetermined window or distance of the reference with which they are associated). A score for each of the descriptors is calculated based on a location of the associated reference within the respective document and/or a location of the respective descriptor within the respective document. A description for the entity is generated utilizing at least some of the descriptors based on the calculated scores. In other words, at least some of the descriptors (e.g., those with relative high scores) are utilized to generate a description for the entity. In some embodiments, this process is performed with respect to multiple search result clusters, such that a unique description is generated for each of the clusters (and/or the associated entity).

Figure 4:
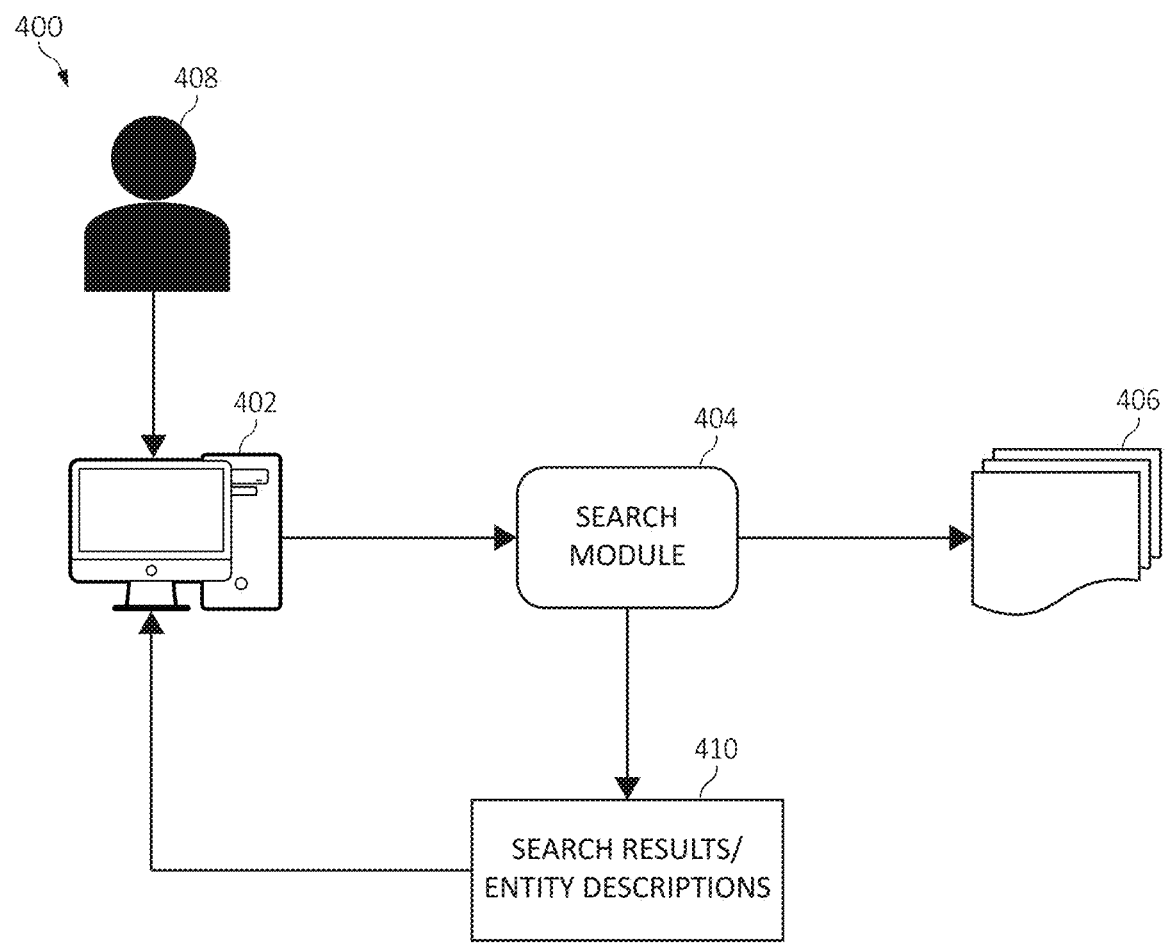
FIG. 4 is a block diagram a computing environment according to an embodiment of the present invention.

FIG. 4 illustrates an exemplary computing environment 400 according to some embodiments of the present invention. In the depicted environment, the computing environment 400 includes a computing device 402, a search module 404, and a corpus 406.

The computing device (or node) 402 may be any suitable computing device, such as those described above (e.g., a desktop PC, a mobile electronic device, etc.), which may be utilized by a user (or individual) 408 to, for example, initiate a search of the corpus and/or view/consume the results thereof. However, it should be understood that the methods described herein may be initiated by a computing device (or system). For example, the methods described herein may be automatically initiated in response to previous events, such as an entity search being performed and/or the results of such a search being received or detected, based on a schedule, etc.).

The search module 404 may include (and/or be implemented with) any suitable computing device or system, such as those described above, and may be configured to perform the searching of corpora, generating descriptions, and/or any associated processes (e.g., a cognitive analysis) and return search results and/or entity descriptions 410 to the user 408 (e.g., via the computing device 402), as described above. The corpus 406 may include one or more of any type of suitable document, file, database, etc., such as unstructured documents, web sites, word processing documents, spreadsheets, electronic communications (e.g., emails, text messages, etc.), audio/video files, etc., that may be accessed and/or is/are searchable by the computing device 402 and/or the search module 404. It should be noted that in embodiments in which a search was previously performed, the corpus 406 shown in FIG. 4 may correspond to the results of the search (e.g., identified entity references, excerpts/portions of the respective documents, etc.).

In some embodiments, the computing device 402, the search module 404, and/or the corpus 406 may be integrated into common computing devices and/or located locally. For example, the search module 404 may be integrated within the computing device 402. However, in some embodiments, the components shown in FIG. 4 may be remote from each other and in operable communication via any suitable communication network (e.g., the Internet).

In some embodiments, if an entity search has not been performed and/or results of such a search are not available to the search module 404 and/or the computing device 402, the user 408 may provide a query or enter a name of an entity (or target/intended entity) to be searched for to the search module 404 (e.g., via the computing device 402). The corpus 406 may then be searched for the entity name(s) using any suitable search algorithm, such as a string-searching algorithm, as is commonly understood. Additionally, embodiments described herein may utilize any suitable solution to account for typographical and spelling errors in (and/or alternative spellings of) entity names provided by users (and/or discovered alternative names), such as string metrics and string matching, as is commonly understood.

The references to the target entity within the corpus 406 may then be identified and/or extracted, perhaps along with excerpts or portions of the respective document(s) within the corpus 406. In some embodiments, the results are clustered with, for example, each cluster representing a particular entity or references to a particular entity with a name (or other identifying term) that matches (or closely matches) the target entity. The results and/or clusters may then be analyzed as described below.

In some embodiments, a score is calculated for (each of) the entity references in the results. In some embodiments, a score in calculated for each (and/or all) of the references. However, the references may be filtered such that only references that are determined to include full or complete names of the target entity (e.g., an individual or person) are considered (and/or scored, utilized, etc.). The score calculated for each of the references may be based on the location of the reference within the respective document. For example, references that are located closer to the beginning (and/or farther from the end) of the respective document may be scored higher than those that are located closer to the end (and/or farther from the beginning) of the respective document (e.g., based on page numbers, word counts before and/or after the references, etc.). The scores may be calculated as numerical values (e.g., between 0.0 and 1.0). However, in some embodiments the scores may be in the form of "grades" (e.g., "high," "low," etc.).

The references may then be further analyzed to, for example, identify and/or extract descriptors (or candidate descriptors) from the documents (or portions of the documents). In some embodiments, only descriptors that are located within a predetermined window (or "distance" or "text distance") of the respective reference are identified and/or utilized. For example, in order for descriptors to be extracted/identified, they may have to occur/appear or be located within the same sentence as the reference, within the phrase (or sentence, clause, etc.) before and/or after the references, and/or be the descriptor that is determined to be closest (or immediate) to the reference (e.g., before and/or after the reference). The descriptors may be noun phrases and/or any other type of phrase that is determined to be descriptive of the reference (or entity). As one particular example, the identifying of the descriptors may include identifying the longest (e.g., with respect to character count) noun phrases within the predetermined window of the reference within the respective document (or document portion). This process may be performed utilizing a NLP technique.

In some embodiments, the terms, phrases, etc. identified as descriptors are then extracted and/or added to a list or set of candidate descriptors. The candidate descriptors may then be scored (or a score for each of the candidate descriptors may then be calculated or determined). As one example, the score assigned to each of the candidate descriptors may be the same as the score calculated for the reference with which the descriptor is associated. For example, if a score of 0.8 is calculated for a particular reference to an entity, and a candidate descriptor for the entity is identified within the appropriate predetermined window of the reference, the candidate descriptor may be assigned the same score (e.g., 0.8).

However, in some embodiments, the descriptor scores are "scaled" or "adjusted" based on, for example, the proximity of the descriptor to the respective reference (and/or the distance between the descriptor and the reference). For example, if the descriptor is located in the phrase immediately adjacent (before or after) the reference (e.g., a distance of "1"), and the calculated score for the reference is 0.8, the descriptor may also be assigned a score of 0.8 (e.g., 0.8×1/ 1). However, if the descriptor is located a distance of "two phrases" away from the reference (e.g., a distance of "2"), the calculated score for the descriptor may be 0.4 (e.g., 0.8×½). In other words, in some embodiments, the descriptor score is calculated by dividing the score of the respective reference by the "distance between" the descriptor and the reference within the respective document. As another example, this "distance" may also be measured in number of alphanumeric characters or linear distance, as opposed to phrases/phrase count.

In some embodiments, the candidate descriptors are then compared to each other to determine if any of them should be "combined" or "consolidated" (or "reconciled"). In particular, each of the candidate descriptors may be compared to each of the other candidate descriptors to determine if any of the descriptors are similar (or relatively similar) to any others (i.e., to determine if any two or more of the descriptors fall within a similarity metric). This process may be performed utilizing a NLP technique, string matching technique, etc. If an appropriate amount of similarity is found between any descriptors, those descriptors may be combined into a "composite" descriptor. The score (or composite score) of composite descriptors may be calculated by combining the scores of the individual descriptors that are combined or reconciled.

For example, if a first descriptor (D1) is determined to be identical to a second descriptor (D2), either D1 or D2 may be removed from the list/set of candidate descriptors, and its score may be added to that of the descriptor that remains on the list (and then utilized as described below). If D1 is determined to be a sub-string of D2, the longer descriptor (D2) may be retained and the shorter descriptor (D1) may removed from the list, and the score of D1 may be added to that of D2. Additionally, the "overlap" of descriptors may be determined or considered. For example, if a certain number of constituents (e.g., terms, alphanumeric characters, etc.) of a smaller (or shorter) descriptor (D1) are contained in a larger (or longer) descriptor D2, the two descriptors may be "collapsed" by removing one of the descriptors from the list, and its score may be added to that of the other, remaining descriptor. The threshold for collapsing ($T_{overlap}$) may be adjusted (e.g., via a system settings or preferences functionality) to tune the algorithm for a particular data set.

As one example, consider a scenario in which a first candidate descriptor is "CEO," and a second candidate descriptor is "Company XYZ CEO." In such an instance, the two descriptors may be consolidated into a single (composite) descriptor, which may be the same as the longer, more complete identified descriptor (e.g., "Company XYZ CEO").

The result of the reconciliation process may be that the list of candidate descriptors includes a set of unique descriptors with scores that reflect the frequency of occurrence of the descriptors (and/or similar descriptors), as well as their potential for being a representative descriptors as expressed by the individual descriptor scores.

In some embodiments, the candidate descriptors (e.g., the remaining, consolidated descriptors) are then sorted or ranked based on the calculated scores. In some embodiments, the candidate descriptors with the highest scores are considered to be more valuable than those with lower scores (although the scoring could be reversed such that lower scores are more desirable).

The list or set of candidate descriptors may then be "pruned" to remove candidates for which little evidence was found in the corpus (e.g., candidates with few mentions and/or relatively low scores). In some embodiments, this may be achieved by simply removing any candidate that received a score below a predetermined threshold ($T_{evidence}$). The threshold may be a parameter that can be adjusted (e.g., via a system settings or preferences functionality) to tune the operation of the system.

As one particular example, this threshold may be set to a value of 3.0, such that any candidate descriptor with a score of below 3.0 is removed from the list/set of candidate descriptors. It should be noted that this threshold may be higher than the maximum possible score for any single instance of a reference and/or descriptor (e.g., 1.0). Thus, in such instances, multiple, similar descriptors would have to be consolidated into a single, composite descriptor (as described above) for the score to meet or exceed the threshold (e.g., a descriptor or similar descriptors would have to appear several times in the corpus to meet the threshold).

One or more of the candidate descriptors may then be utilized to generate a description (or summary) for (e.g., one or more phrases to describe) the target entity (and/or for the cluster(s) of results). The top n (e.g., one or two) descriptors may then be utilized to generate the description. In some embodiments, more than one descriptor (e.g., the two or three descriptors with the highest scores) is utilized to generate the description.

It should be noted that utilizing more than one descriptor may allow the generated description to capture (or describe) the changes in descriptors (and/or the entity) over time (e.g., over the lifetime of an individual). For example, if the entity is an individual who is associated with basketball, the utilization of multiple descriptors may allow the generated description to capture the changing role/position of the individual over time (e.g., "basketball player," "coach," and "team owner").

The results of the search may then be provided to the user. For example, referring again to FIG. 4, the entity description(s) 410 may be provided to the user 408, perhaps along with and/or in conjunction with a representation(s) of the clusters generated by the entity search, which may include portions/excerpts/passages of the documents that include the reference. The results and/or the description(s) may be provided to the user by rendering such on any appropriate rendering device, such as a display screen of a computing device (e.g., via an electronic communication, pop-up window, etc.). Although it should be noted that in some embodiments, the generated description(s) may (also) be rendered in an audible/aural manner (e.g., via a speaker).

Figure 5:
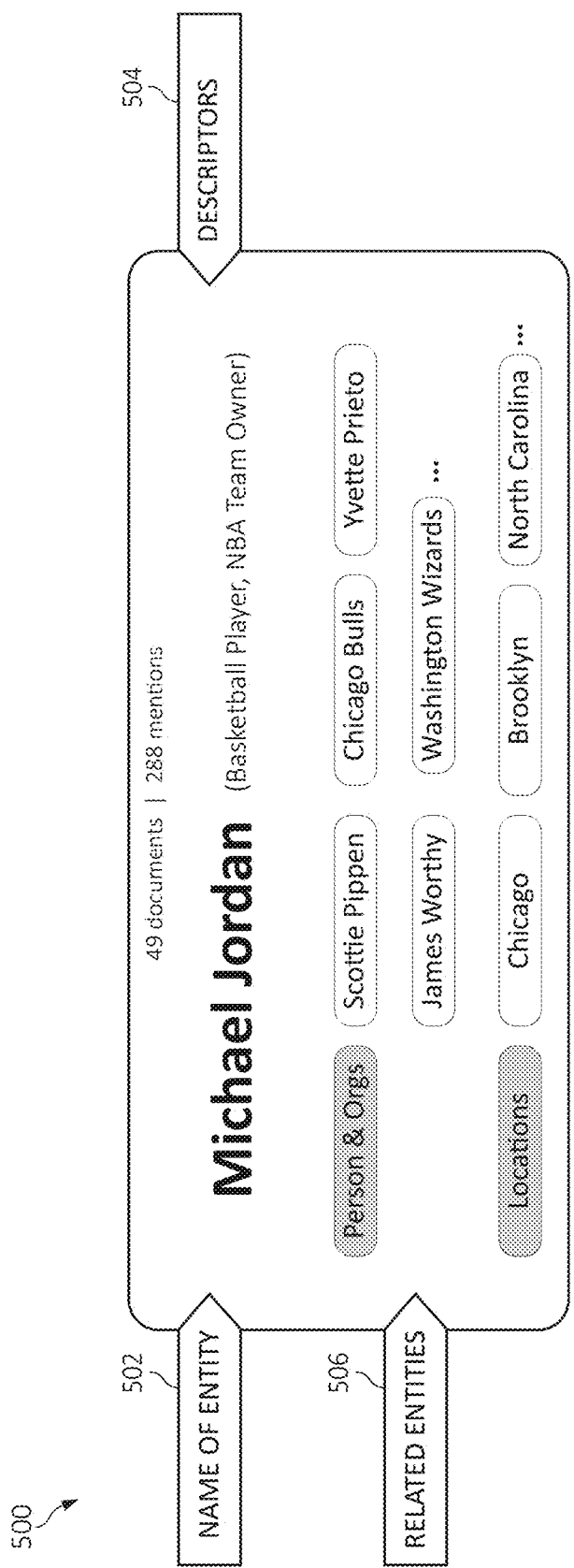
FIG. 5 is a view of an exemplary table of information, including a generated description, associated with an entity according to an embodiment of the present invention.

FIG. 5 depicts an exemplary set of search results (or a portion thereof) according to an embodiment of the present invention. More specifically, FIG. 5 illustrates an exemplary information table 500 associated with a particular cluster or bin (e.g., associated with a particular entity) within a set of search results. In the example shown, the target entity is "Michael Jordan," as indicated by/listed under/next to name of entity label (or section) 502. Of particular interest in FIG. 5 is descriptors (or description) label 504, which indicates the description(s) "basketball player, NBA team owner." As such, it should be understood that in the depicted embodiment, "basketball player, NBA team owner" is the description for the particular entity associated the cluster/bin represented by information table 500, which has been generated by the system in response to performing a search for the target entity "Michael Jordan." In some embodiments, a similar table (or set of information) may be generated/provided for each of the clusters/bins (and/or the associated entities) in the search results.

It should also be noted that other types of information associated with the particular entity is shown in the table 500. In particular, the table 500 also includes a related entities label 506, next to which are listed various persons/organizations (e.g., "Scottie Pippen," "Chicago Bulls," etc.) and locations (e.g., "Chicago," "Brooklyn," etc.) that have been determined to be related to the target entity. Although not described in detail, such other types of information associated with the entity may be identified and/or extracted during the searching described above.

Figure 6:
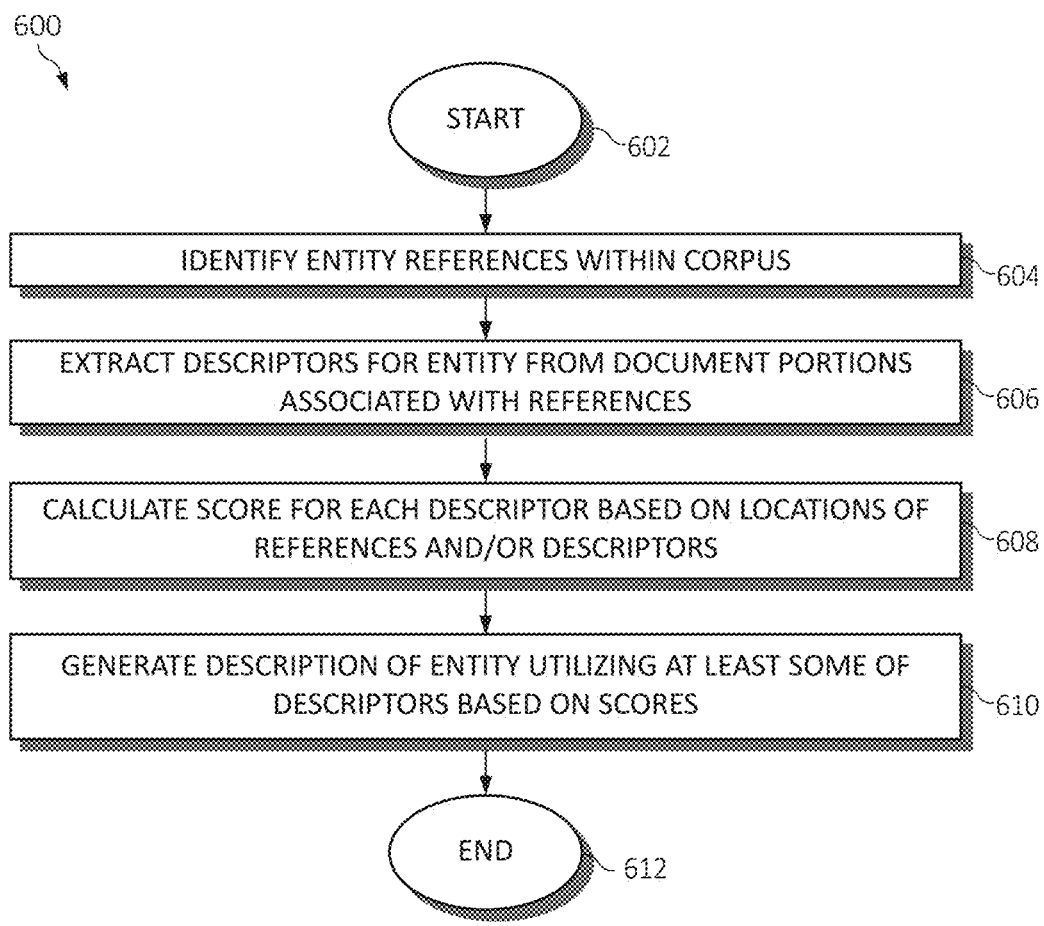
FIG. 6 is a flowchart diagram of an exemplary method for generating descriptions of entities according to an embodiment of the present invention.

Turning to FIG. 6, a flowchart diagram of an exemplary method 600 for generating a description of an entity is provided. The method 600 begins (step 602) with, for example, a search for references to a target entity within a corpus (e.g., one or more documents) being performed and/or results of such a search being made accessible by a computing device/system and/or search module, as described above.

A plurality of references (or one or more references) to the entity within a corpus are identified (or received) (step 604). As described above, in some embodiments, a search for references to an entity within a corpus is previously performed, and the results thereof are received or retrieved by the system. The results may be provided in "clusters" (or "bins") with each cluster representing a particular entity (e.g., having the same or a similar name as/to the target entity).

Descriptors for the entity are extracted from portions of the plurality of documents associated with the plurality of references to the entity (step 606). For example, each of the descriptors may be located within a predetermined window of the reference associated with the descriptor within the respective document. The extracting of the descriptors may be performed utilizing a NLP technique. Each of the descriptors may include, for example, at least one noun phrase.

A score for each of the descriptors is calculated based on at least one of a location of the reference associated with the descriptor within the respective document and a location of the descriptor within the respective document (step 608). For example, the calculating of the score for each of the descriptors may be based on a location of the reference associated with the descriptor within the respective document and/or a proximity of the descriptor to the reference associated with the descriptor.

Each of the descriptors may be compared to the other descriptors. A first of the descriptors having a first calculated score and a second of the descriptors having a second calculated score may be consolidated into a composite descriptor based on the comparison of the descriptors. A composite score for the composite descriptor may be calculated based on the first calculated score and the second calculated score (e.g., by adding the first and second scores).

A description of the entity is generated utilizing at least some of the descriptors based on the calculated scores (step 610). The generating of the description may be performed utilizing only those of the descriptors with a calculated score above a predetermined threshold.

Method 600 ends (step 612) with, for example, the results of the search being provided to the user. For example, the generated description of the entity may be caused to be rendered by a rendering device. In some embodiments, multiple descriptions are generated, with each description being associated with a particular cluster of the results of the search for the entity within the corpus. In some embodiments, feedback from users (e.g., early adopters and/or later uses) may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for generating a description of an entity, by a processor, comprising:
   receiving, from a user performing input on a user interface of a computing device incorporating the processor, a search query for an entity;
   identifying a plurality of references to the entity within a corpus, wherein the corpus includes a plurality of documents;
   extracting descriptors for the entity from portions of the plurality of documents associated with the plurality of references to the entity;
   calculating a score for each of the descriptors based on a location of the reference associated with the descriptor within the respective document and a location of the descriptor within the respective document, wherein those of the descriptors located earlier within the respective document, as compared to subsequent descriptors within the respective document, contribute to a higher value of the calculated score, and wherein the calculating of the score is performed using executed machine learning logic;

generating a description of the entity utilizing at least some of the descriptors based on said calculated scores; and rendering the generated description of the entity on the user interface of the computing device as an output to the search query for the entity.

2. The method of claim 1, wherein each of the descriptors is located within a predetermined window of the reference associated with the descriptor within the respective document.

3. The method of claim 1, wherein the calculating of the score for each of the descriptors is based on a location of the reference associated with the descriptor within the respective document and a proximity of the descriptor to the reference associated with the descriptor.

4. The method of claim 1, wherein the extracting of the descriptors is performed utilizing a natural language processing technique, and each of the descriptors includes at least one noun phrase.

5. The method of claim 1, further comprising:
comparing each of the descriptors to the others of the descriptors;
consolidating a first of the descriptors having a first calculated score and a second of the descriptors having a second calculated score into a composite descriptor based on the comparing of each of the descriptors to the others of the descriptors; and
calculating a composite score for the composite descriptor based on the first calculated score and the second calculated score.

6. The method of claim 1, wherein the generating of the description of the entity utilizing the at least some of the descriptors is performed utilizing only those of the descriptors with a calculated score above a predetermined threshold.

7. A system for generating a description of an entity comprising:
a processor executing instructions stored in a memory device, wherein the processor:
receives, from a user performing input on a user interface of a computing device incorporating the processor, a search query for an entity;
identifies a plurality of references to an entity within a corpus, wherein the corpus includes a plurality of documents;
extracts descriptors for the entity from portions of the plurality of documents associated with the plurality of references to the entity;
calculates a score for each of the descriptors based on a location of the reference associated with the descriptor within the respective document and a location of the descriptor within the respective document, wherein those of the descriptors located earlier within the respective document, as compared to subsequent descriptors within the respective document, contribute to a higher value of the calculated score, and wherein the calculating of the score is performed using executed machine learning logic;
generates a description of the entity utilizing at least some of the descriptors based on said calculated scores; and
renders the generated description of the entity on the user interface of the computing device as an output to the search query for the entity.

8. The system of claim 7, wherein each of the descriptors is located within a predetermined window of the reference associated with the descriptor within the respective document.

9. The system of claim 7, wherein the calculating of the score for each of the descriptors is based on a location of the reference associated with the descriptor within the respective document and a proximity of the descriptor to the reference associated with the descriptor.

10. The system of claim 7, wherein the extracting of the descriptors is performed utilizing a natural language processing technique, and each of the descriptors includes at least one noun phrase.

11. The system of claim 7, wherein the processor further:
compares each of the descriptors to the others of the descriptors;
consolidates a first of the descriptors having a first calculated score and a second of the descriptors having a second calculated score into a composite descriptor based on the comparing of each of the descriptors to the others of the descriptors; and
calculates a composite score for the composite descriptor based on the first calculated score and the second calculated score.

12. The system of claim 7, wherein the generating of the description of the entity utilizing the at least some of the descriptors is performed utilizing only those of the descriptors with a calculated score above a predetermined threshold.

13. A computer program product for generating a description of an entity, by a processor, the computer program product embodied on a non-transitory computer-readable storage medium having computer-readable program code portions stored therein, the computer-readable program code portions comprising:
an executable portion that receives, from a user performing input on a user interface of a computing device incorporating the processor, a search query for an entity;
an executable portion that identifies a plurality of references to an entity within a corpus, wherein the corpus includes a plurality of documents;
an executable portion that extracts descriptors for the entity from portions of the plurality of documents associated with the plurality of references to the entity;
an executable portion that calculates a score for each of the descriptors based on a location of the reference associated with the descriptor within the respective document and a location of the descriptor within the respective document, wherein those of the descriptors located earlier within the respective document, as compared to subsequent descriptors within the respective document, contribute to a higher value of the calculated score, and wherein the calculating of the score is performed using executed machine learning logic;
an executable portion that generates a description of the entity utilizing at least some of the descriptors based on said calculated scores; and
an executable portion that renders the generated description of the entity on the user interface of the computing device as an output to the search query for the entity.

14. The computer program product of claim 13, wherein each of the descriptors is located within a predetermined window of the reference associated with the descriptor within the respective document.

15. The computer program product of claim 13, wherein the calculating of the score for each of the descriptors is based on a location of the reference associated with the descriptor within the respective document and a proximity of the descriptor to the reference associated with the descriptor.

16. The computer program product of claim 13, wherein the extracting of the descriptors is performed utilizing a natural language processing technique, and each of the descriptors includes at least one noun phrase.

17. The computer program product of claim 13, wherein the computer-readable program code portions further include:
  an executable portion that compares each of the descriptors to the others of the descriptors;
  an executable portion that consolidates a first of the descriptors having a first calculated score and a second of the descriptors having a second calculated score into a composite descriptor based on the comparing of each of the descriptors to the others of the descriptors; and
  an executable portion that calculates a composite score for the composite descriptor based on the first calculated score and the second calculated score.

18. The computer program product of claim 13, wherein the generating of the description of the entity utilizing the at least some of the descriptors is performed utilizing only those of the descriptors with a calculated score above a predetermined threshold.

\* \* \* \* \*